G. B. BOWLES.
BRAKE APPARATUS PARTICULARLY APPLICABLE TO RAILWAY WAGON BRAKES.
APPLICATION FILED NOV. 27, 1908.
1,017,504.
Patented Feb. 13, 1912.
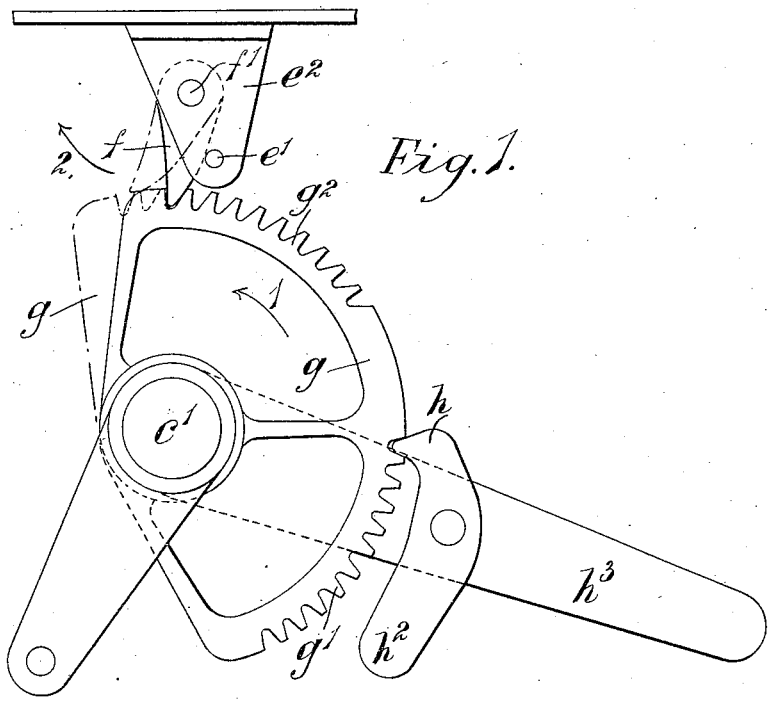
Fig. 1.
Fig. 2.
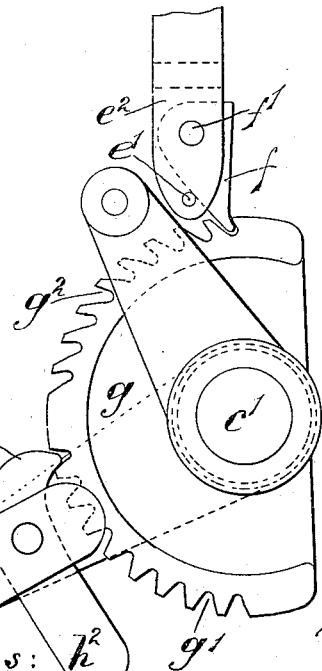
Witnesses:
Inventor:
George Barker Bowles

UNITED STATES PATENT OFFICE.

GEORGE BARKER BOWLES, OF FOREST GATE, LONDON, ENGLAND.

BRAKE APPARATUS PARTICULARLY APPLICABLE TO RAILWAY-WAGON BRAKES.

1,017,504. Specification of Letters Patent. Patented Feb. 13, 1912.

Application filed November 27, 1908. Serial No. 464,779.

*To all whom it may concern:*

Be it known that I, GEORGE BARKER BOWLES, a subject of the King of Great Britain and Ireland, residing at Forest Gate, in the county of London, England, have invented Improvements in and Relating to Brake Apparatus Particularly Applicable to Railway-Wagon Brakes, of which the following is a specification.

This invention relates to automatic wear-compensating apparatus for railway brakes, embodying operating mechanism wherein an operating toothed member, which also forms the locking member for the wear-compensating apparatus, is connected to the brakes through suitable brake rigging and is controlled by two pawls, one of which (hereinafter called for distinction the operating pawl) is used to move the toothed member in a direction to apply the brake, and the other of which (hereinafter called for distinction the anchoring pawl) allows the toothed member to move forward but limits its return movement, and, upon undue wear of the brake blocks taking place, slips behind the tooth that previously acted upon it and thereby prevents the toothed member and attached parts returning to their original positions, so as to compensate for such wear and insure that the brake blocks shall remain always effective without attention until finally worn out.

It has already been proposed to provide the anchoring pawl with a slot so that it can slide upon a stationary pivot and be moved back by a locking wheel of the wear-compensating apparatus as the brake is released, but such an arrangement involves firstly the use of springs to cause the pawl to follow the forward movement of the locking wheel until such time as wear becomes excessive, and secondly of guiding means for preventing sidewise movement of the pawl out of engagement with the teeth of the locking wheel. Furthermore, with such an arrangement of spring actuated slotted pawl there is danger of the pawl, owing to failure of the spring that bears against it, or from other causes, failing to move forward from its rear position when the locking wheel is turned in a forward direction, with the result that if it should then slip behind a tooth of the locking wheel to compensate for wear of the brake blocks, it cannot move backward to allow of return movement of the locking wheel but will on the contrary lock the wheel and connected brake blocks in the "on" position when they should be released and allowed to return to the "off" position.

The object of the present invention is to provide an improved arrangement in which the required movement of the locking member is obtainable without slotting the anchoring pawl or using springs and guiding means. For this purpose the anchoring pawl is mounted to turn about but not to move endwise upon its pivot which is so arranged that the pawl can swing to and fro with forward and backward movement of the toothed member, the return movement of the pawl, and consequently of the toothed member, being limited by a separate fixed pin or stop, the anchoring pawl engaging the teeth of the toothed member and being operated thereby after the manner of a toothed wheel having only one tooth and a limited backward motion. By this arrangement there is no possibility of the brake blocks being locked in the applied position after the anchoring pawl has slipped over a tooth. The toothed member may be in the form of a ratchet wheel or segment mounted to turn about a fixed axis, or be in the form of a toothed rack having a longitudinal movement.

In the accompanying drawings, Figures 1 and 2 show in side elevation, wear-compensating apparatus of the kind referred to constructed according to the present invention.

In the arrangement shown in Fig. 1, the toothed member $g$, shown in the form of a ratchet segment, is carried by a shaft $c^1$ and provided with teeth $g^1$ to admit of its being moved forward, in the direction of the arrow 1, by the operating pawl $h$ carried by the lever $h^3$ which is mounted to turn on the shaft $c^1$ and is adapted, when operated, to apply the brakes through the pawl $h$, the ratchet segment $g$ and any suitable arrangement of brake rigging (not shown) connected thereto. The pawl $h$ is loaded, as by a weight $h^2$, to cause it to at all times engage the teeth $c$.

The anchoring pawl $f$ is mounted to turn upon a pin $f^1$ carried by a suitable support such as a bracket $e^2$ fixed to the wagon frame, the said pawl being arranged to engage teeth $g^2$ on the ratchet segment $g$ so as to be operated thereby after the manner of a single toothed wheel, the effecive length of the pawl being, for this purpose, less than the shortest distance between the center of the pivot pin $f^1$ and the bottom of the space between two of the teeth $g^2$ at opposite sides of a radial line of the ratchet segment passing through the axis of the pivot pin $f^1$.

$e^1$ is a fixed pin or stop carried by a stationary part of the wagon, for example the bracket $e^2$, so as to admit of the anchoring pawl $f$ being turned freely in the direction of the arrow 2 but serving as a stop or abutment to limit the backward movement of the anchoring pawl and of the ratchet segment $g$ with which it is engaged. The lever $h^3$ may be operated by hand or other power for operating the ratchet segment $g$ and connected brake mechanism and brake blocks, as well understood.

To apply the brakes, the lever $h^3$ is raised so as to cause the operating pawl $h$ to partly rotate the ratchet segment $g$. During this movement the anchoring pawl $f$ is turned forwardly and upwardly, as indicated in dotted lines, by the tooth $g^2$ immediately to the rear of it, and upon the ratchet segment $g$ being turned, or allowed to turn in the backward direction, to take off the brake, the pawl $f$ is returned by gravity or otherwise until it bears against the pin $e^1$ whereby it is arrested, whereupon by acting upon the rear side of the tooth $g^2$ in front of it, it will act to prevent further return-movement of the ratchet segment. During the forward movement of the ratchet segment, the pawl $f$ does not actually reach the free end of the operating tooth $g^2$ to the rear of it unless, owing to undue wear of the brake blocks and wheels, the lever $h^3$ requires a longer stroke than usual to apply the brakes, in which case the pawl $f$ will reach the extreme end of the inclined surface of the rear tooth upon which it had previously been riding, and pass to the rear side of such tooth so that when the ratchet segment $g$ is again turned in a backward direction, the anchoring pawl $f$ will turn backward until it is arrested by the pin $e^1$. The pawl $f$ will then act against the rear side of the tooth $g^2$ over which it has slipped, and prevent the ratchet segment being returned to its original position. In this way the necessary readjustment of the brake mechanism is effected automatically as soon as the wear of the brake blocks reaches a predetermined amount. When, after automatic readjustment of the parts has taken place as described, the lever $h^3$ is lowered to its normal position, the loaded pawl $h$ will, by reason of the ratchet segment $g$ having been prevented by the anchoring pawl $f$ from returning to its original position, slip over the tooth $g^1$ to the rear of it and engage the rear side of such tooth, thereby advancing the position of the ratchet segment in relation to the lever.

The arrangement shown in Fig. 2 is similar to that shown in Fig. 1 and operates in substantially the same manner but the parts are suitable for application to a combined hand and power brake. Also, the teeth $g^2$ are undercut and the nose or point of the anchoring pawl $f$ is bent forward to enter the undercut side of the tooth in front of it, so as to admit of a greater forward and return movement of the ratchet segment $g$ than if the teeth $i$ were cut as shown in Fig. 2.

As will be seen, in each arrangement, instead of the anchoring pawl $f$ and its pivot pin $f^1$ being so arranged that the return movement of the toothed member $g$ is limited by a resistance exerted lengthwise through the pawl and its pivot, as in the known wear compensating arrangement hereinbefore referred to, the said anchoring pawl and its pivot are arranged so that the pawl can, upon forward movement of the toothed member be turned in a forward direction about its pivot by the toothed member, and can, upon the return movement of the toothed member, turn in a backward direction until it bears against the pin $e^1$, whereupon it will arrest further return movement of the toothed member, the anchoring pawl engaging the teeth of the toothed member and being operated thereby, after the manner of a one toothed wheel having a limited backward motion. This action is rendered possible by the fact that the anchoring pawl is of a length that it could, if it were not for the pin $e^1$, turn backward and forward across a line joining the axes of the pin $f^1$ and shaft $c^1$. Also, it will be seen that by the arrangement described, the anchoring pawl $f$, after slipping over a tooth to effect re-adjustment of the parts, is permitted to turn backward to a sufficient extent to prevent any possibility of the brake blocks being locked in the applied position. Also, it will be seen that by varying the position of the pin $e^1$, the extent of backward movement of the ratchet segment $g$, after the readjustment of the parts, can be readily varied to suit any desired requirement without alteration of the ratchet segment or other parts of the apparatus.

What I claim is:—

1. Means for automatically adjusting a brake block, comprising a toothed member for transmitting power to the brake block, a movable brake operating member, a pawl carried by the brake operating member and adapted to engage and operate the toothed member, a stationary support adjacent to the toothed member, an anchoring pawl pivoted to the said support so that it can turn between said support and the toothed member after the manner of a toothed wheel but cannot move endwise, said anchoring pawl being arranged to slide upon one tooth of the ratchet member while the brake block is properly adjusted, to automatically ride over the said tooth when the block requires readjustment and to turn backward with backward motion of the toothed member, and a stop to limit the extent of backward turning movement of said anchoring pawl and toothed member.

2. Means for automatically adjusting a brake block, comprising a toothed member for transmitting power to the brake block, a movable brake operating member, a pawl carried by the brake operating member and engaging the toothed member, a stationary support adjacent to the toothed member, an anchoring pawl pivoted to the said support so as to be capable of turning thereon but not of moving endwise, said anchoring pawl gearing with said toothed member and being of less effective length than the shortest distance between its center of motion and the bottom of the space between two teeth of said toothed member, and a stop arranged to permit of limited backward turning movement of said anchoring pawl and toothed member.

3. Means for automatically adjusting a brake block, comprising a toothed member for transmitting power to the brake block, a movable brake operating member, a loaded pawl carried by the brake operating member and engaging the said toothed member, a stationary support adjacent to the toothed member, a pivot pin carried by said support, an anchoring pawl mounted on said pivot pin so that it can turn thereon but cannot move endwise, said anchoring pawl normally hanging substantially in a vertical position and gearing after the manner of a toothed wheel with the teeth of the toothed member, and a fixed stop arranged to permit of a limited backward turning motion of said anchoring pawl and toothed member sufficient to prevent locking of the brake block after the anchoring pawl has slipped backward over the tooth that previously turned it in a forward direction, owing to predetermined wear of said block.

4. Means for automatically adjusting the brake blocks of a railway wagon, comprising, in combination, a shaft, an operating lever thereon, a ratchet quadrant on said shaft, an operating pawl pivoted to said lever and engaging the ratchet quadrant, a stationary bracket adjacent to the ratchet quadrant, a pivot pin carried by said bracket, an anchoring pawl mounted to turn but not to move endwise upon said pin and gearing with the teeth of said ratchet quadrant so as to turn therewith after the manner of a toothed wheel and permit of retractile movement of the quadrant after said anchoring pawl has slipped backward over one tooth and engaged the next, and a fixed stop arranged to arrest the anchoring pawl and quadrant after the same have turned backward to a sufficient extent to prevent locking of the brake block in the "on" position after re-adjustment of said quadrant to compensate for wear, substantially as described.

5. Means for automatically adjusting the brake blocks of a railway wagon, comprising, in combination, a shaft, a ratchet quadrant on said shaft, a lever mounted on the said shaft, a weighted operating pawl pivoted to the said lever and engaging the ratchet quadrant, a stationary bracket adjacent to the ratchet quadrant, a pivot pin carried by said bracket, an anchoring pawl mounted to turn but not to move endwise on said bracket and gearing with said ratchet quadrant, said anchoring pawl being of less effective length than the radial distance between the axis of said pin and the bottom of the space between two teeth of the quadrant, and a fixed stop for limiting backward motion of the anchoring pawl and quadrant, the teeth of the ratchet quadrant engaged by said anchoring pawl being undercut as set forth.

Signed at London, England this 18th day of November 1908.

GEORGE BARKER BOWLES.

Witnesses:
SIDNEY COCKERILL,
F. L. RAND.

---

Copies of this patent may be obtained for five cents each, by addressing the "Commissioner of Patents, Washington, D. C."